July 30, 1968  R. O. A. F. LAURENT  3,394,432
APPARATUS FOR THE PRODUCTION OF HELICALLY TOOTHED
MECHANICAL PARTS FROM SINTERED METALS
Filed Dec. 14, 1964  2 Sheets-Sheet 1

INVENTOR
ROGER, OLIVIER, ANTOINE,
FERNAND LAURENT

BY

Nolte & Nolte
ATTORNEYS

United States Patent Office 3,394,432
Patented July 30, 1968

3,394,432
APPARATUS FOR THE PRODUCTION OF
HELICALLY TOOTHED MECHANICAL
PARTS FROM SINTERED METALS
Roger Olivier Antoine Fernand Laurent, Brussels,
Belgium, assignor to Societe Anonyme Ateliers
R. Laurent, Gosselies, Belgium
Filed Dec. 14, 1964, Ser. No. 418,188
Claims priority, application Belgium, Dec. 18, 1963,
514,457
3 Claims. (Cl. 18—16.5)

ABSTRACT OF THE DISCLOSURE

A female die having sintered powder therein is positioned in operative proximity with a ram in a manner whereby rotation of the ram causes it to penetrate the die to compress the powder. An annular member having tooth systems on its inside and outside surfaces is positioned around a tooth system on the outside surface of the ram with the inside tooth system engaged with the tooth system of the ram. An annular casing having a tooth system on its inside surface is positioned around the annular member with its tooth system engaged with the outside tooth system of the annular member. The tooth systems of the ram, member and casing have a predetermined relationship with the pitch and inclination of helically toothed parts produced by the apparatus. The casing is moved in a manner which rotates the ram to cause penetration of the ram into the die.

This invention relates to apparatus for the production of helically toothed mechanical parts from sintered metals.

The production of parts of machinery from sintered metals, particularly ferrous and non-ferrous alloys, is now commonly used, and very many types of parts have been produced by means of this process. The process brings advantages both as regards economy in raw materials and in manpower, and as regards the rapid manufacture of mechanical parts of shapes which would be very expensive to produce by the conventional processes used hitherto.

Up to the present time, besides parts of complicated shapes, it has only been possible to produce mechanical parts provided with straight teeth parallel to the axis of displacement of the press plates.

The aim of the present invention is to permit the production of mechanical elements provided with helical toothing, for example gearwheels, in a press, and the apparatus according to the invention, for the production of helically toothed mechanical parts from sintered metals, comprises a press having a ram which is arranged to be engaged in a female die so as to compress metallic powder deposited therein and which is provided at its die-engaging end with a helical tooth system corresponding to that formed in the inner wall of the female die, the base of the ram or ram carrier being arranged to form part of a gear train, the tooth systems of which are in a specific relationship with the pitch and the inclination of the tooth system of the mechanical part to be constructed, and the gear train being subjected to a compressive or tractive force causing rotational movement of the ram and permitting the penetration thereof into the female die.

Preferably the rotational movement of the ram is obtained by means of a gear train acting on the base of said ram, this base constituting the central element of the said gear train. The characteristics of the gear train are dependent on those of the tooth system to be produced, more especially as regards the radius and the inclination of said tooth system. For example, in order to produce a tooth system the inclination of which is less than 15°, use is made of a two-element gear train. Similarly, it is necessary to use a three-element gear train to form tooth systems, the inclination of which is more than 15° and may be as much as 45° and above.

In all cases, these gear trains are to be calculated and constructed in such a manner as to bring about the rotational movement of the ram without shock, without friction, and without vertical or horizontal displacement of the ram.

Figure 1:
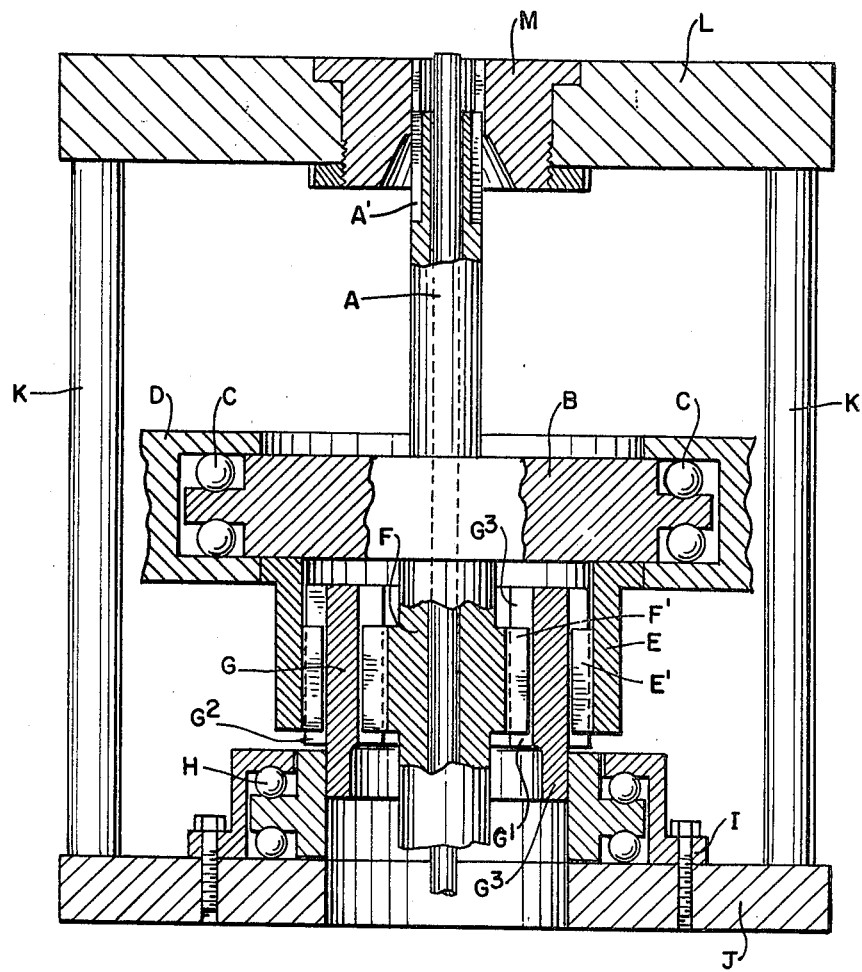
Figure 2:
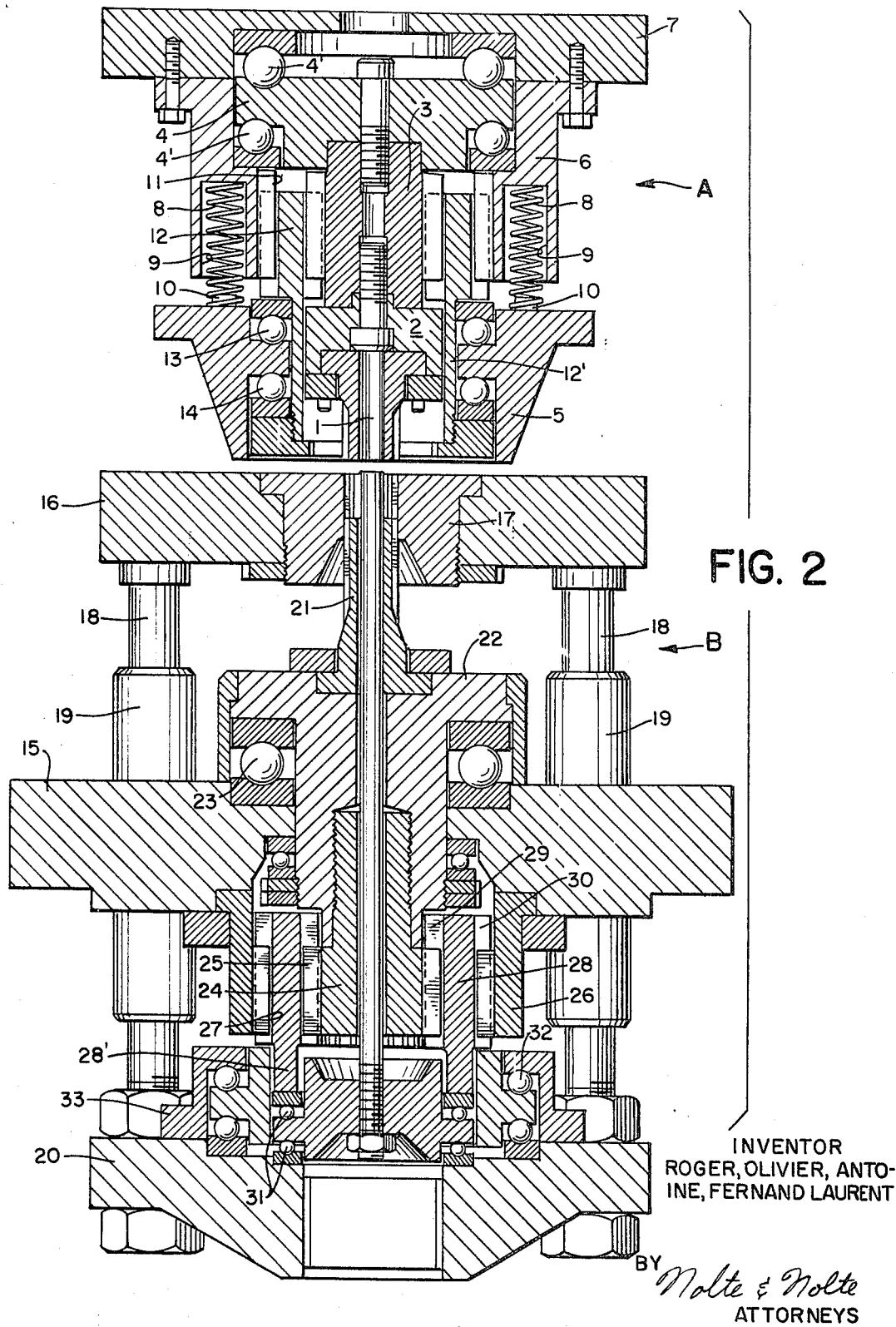

An example of apparatus in accordance with the invention is illustrated in the accompanying drawings, wherein:

FIG. 1 is a diagrammatic view of the mounting of the ram with its gear train, showing the lateral and vertical supporting elements of the ram; and FIG. 2 is an elevational view, partly in section, showing the mechanical elements intended for the equipment of the plates of the hydraulic press and for the production of helically toothed gearwheels from sintered metals.

The apparatus shown in the drawings comprises an upper ram A and its mechanism carried by the upper plate (not shown) of the press, and a female die M and a lower ram forming part of the equipment of the lower plate of the press.

According to the diagrammatic view shown in FIGURE 1, the ram A is fast both in the vertical plane and in the horizontal plane with a ram carrier B which itself is fast, by means of one or more ball-type thrust bearings C and/or by one or more radial ball bearings, with an immobile part of the press, for example the lower plate D of said press. The ram carrier B is extended at its lower portion by a gearwheel F provided with a helical tooth system F'.

This gearwheel F extends between the inner walls of a casing E which is internally toothed as shown at E', and is fast with the lower plate D and which extends almost at the same height as the lower face of the gearwheel F. Between the tooth system of this gearwheel F and that of the casing E there is arranged an internally and externally toothed annulus G, its internal tooth system G1 being in mesh with the tooth system F' of the gear wheel F and its external tooth system G2 being in engagement with the internal tooth system E' of the casing E.

The annulus G is provided with an annular extension G3 extending downwardly and bearing on one or more ball-type thrust bearings H (only one of which is illustrated), with which it is fast and which is held by a cap I which itself is fast with a plate J which is connected by rigid arms K which extend vertically and are connected fixedly to a table L, to the center of which is fixed the female die M surrounding a screw-threaded head A' of the ram A.

The assembly formed by plate J, the arms K and the table L is rigid and non-deformable, and it can therefore be displaced in the vertical sense relatively to the assembly constituted by the ram A, the ram carrier B, the plate D and the gearwheel F fast with the ram A.

If the assembly described above is urged downwards, for example as a result of an action exerted on the table L, the toothed annulus G which is integral by means of the thrust bearing H with the plate J is drawn downwards and effects a relative rotational movement with respect to the tooth system of the casing E the latter being fixed. The annulus G drives in rotational movement the gearwheel F which is integral with the ram carrier B and the ram A, the rotational movement of the gearwheel being dependent on the relationships between the pitch and the characteristics of the screwthreads on the three elements (casing, annulus and gearwheel).

It is particularly specified that the characteristics of the tooth systems of these elements are to be calculated and constructed in such a manner that the gearwheel F, situated at the base of the counter-ram and consequently the ram itself, effects a rotational movement corresponding to the pitch and inclination of the screw-thread provided on the inner wall of the female die into which the screw-threaded head of the ram is engaged, so that the said engagement is effected without shock and without any vertical or horizontal stresses.

It is necessary that the gear train brings about only the rotational movement of the ram, without any modification in the position of the ram either in the vertical plane or in the horizontal plane.

In FIGURE 2, the assembly A comprising an upper ram 1 is integral with the upper plate (not shown) of the press.

The upper ram 1 is fast with a ram carrier 2 on which is fixed a gearwheel 3 which, itself, is fast with a plate 4 and this assembly is lodged partly in a lower cap 5 and partly in a casing 6 which is closed at its upper end by a cap 7, the latter being itself fixed appropriately to the lower face of the upper plate (not shown) of the press. Arranged between the cap 7, the plate 4 and an inner shoulder of the casing 6 is a double ball-type thrust bearing 4'. Provided between the lower cap 5 and the casing 6 is a ring of springs 8, the said springs being inserted in an annular chamber 9 formed in the thickness of the wall of the casing 6, and each being disposed over a corresponding one of a plurality of pins 10 which pins are integral with the upper face of the lower cap 5.

The wall of the inner chamber of the casing 6 is provided with a helical tooth system 11 which is in mesh with the outer tooth system of an annulus 12 whose inner tooth system is in mesh with the tooth system of the gearwheel 3. The double-toothed annulus 12 bears by means of an extension 12' on the thrust bearing 13 mounted in the upper portion of the lower cap 5 and against a thrust bearing 14 lodged in the middle portion of the said cap 5.

When the upper plate of the press carries out a downward travel, the lower edge of the assembly A carrying the upper ram bears on the upper face of the table carrying the female die, and the assembly constituted by the casing 6 and cap 7 continues its travel until the instant at which it comes into contact with the upper face of the cap 5.

This relative rotational movement between the casing and the cap drives in rotational movement gear elements 11–12, and the gearwheel 3, the latter being fast with the ram 1 and causing the rotational movement of the latter in accordance with the pitch of the inner tooth system of the female die and therefore permitting the penetration of the said ram 1 in the said die.

It will be apparent that the pitch and the diameter of the tooth systems of the gear train causing the rotational movement of the ram 1 are to be arranged in a precisely defined ratio with the pitch and the diameter of the tooth system of the female die.

The step-down gear train represented and described above is suitable for tooth systems whose inclination is 15° and may be as much as 45° and more.

If the screw-thread to be formed has an inclination equal to or less than 15°, the gear train may comprise only two elements (screw and nut).

The assembly B in FIGURE 2 is fast with a lower plate 15 of the press and comprises a table 16 wherein a female die 17 is lodged and fixed. This table is fast with four sliding spindles 18 engaged in tubular guides 19 extending through the plate 15.

A lower ram 21 is fast with a ram carrier 22 which extends through the plate 15 and is carried by a ball bearing 23. At its lower portion, the ram carrier 22 is prolonged by a gearwheel 24 provided with a helical tooth system 25. This gearwheel 24 extends between the inner walls of a casing 26 which is internally toothed and is fast with the lower face of the plate 15 and which extends approximately at the same height as the lower face of the gearwheel 24. Between the tooth system 25 of the said gearwheel 24 and an inner tooth system 27 of the casing 26 there is arranged an internally and externally toothed annulus 28, its inner tooth system 29 being in mesh with the tooth system 25 of the gearwheel 24 and its outer tooth system 30 being in mesh with the inner tooth system 27 of the casing 26.

The annulus 28 is provided with an annular extension 28' which extends downwardly and bears on a ball-type thrust bearing 31 arranged in a cross-head 20, and which is supported laterally by a ball-type thrust bearing 32 which is held by an annular cover 33 fixed also on the upper face of the cross-head 20.

In the position of the assembly B which is shown in FIGURE 2, the table 16 has been lowered by the pressure exerted on the latter by the assembly A, actuated by the upper plate of the press.

Under this pressure the table has, by means of the spindles 18 slidable in the tubular guides 19, lowered the cross-head 20 which, itself, has applied a tractive force by means of the assembly constituted by the thrust bearings 31 and 32, on the toothed annulus 28 engaged between the gearwheel 24 and the toothed casing 26.

This tractive force causes the rotational movement of the said annulus relatively to, on the one hand, the tooth system 27 of the casing 26 and, on the other hand, relatively to the tooth system 25 of the pinion 24; this rotational movement which is dependent on the ratio established by calculation and existing between the tooth systems 27, 30 and 29, 25 of the gear train 24–28–26, necessaroly causes the rotation of the gearwheel 24 which is fast with the ram carrier 22 and consequently the ram 21. The said relationship between these tooth systems has the result that the ram 21 screws into the die 17 which moves downwards, in accordance with the pitch and the inclination of the inner toothing of the said die. The ram may without difficulty carry out its mission which consists in compressing in the die the metallic powder which has been deposited therein, in accordance and synchronously with the identical action carried out by the upper ram 1 which is carried by the upper plate and which operates identically to the ram 21.

It is to be noted particularly that the rotational movement of the gearwheel integral with the ram carrier and consequently the ram is dependent on the relationships between the pitch and the characteristics of the elements of the gear train, as explained previously.

What is claimed is:

1. Apparatus for producing mechanical parts from sintered powder, said parts having helically toothed portions, said apparatus comprising a ram having a helically threaded head; a ram carrier affixed to said ram in spaced relation with the head of said ram and having an outside surface, said ram carrier having a helical tooth system on its outside surface; a female die having sintered powder therein and positioned in operative proximity with said ram in a manner whereby rotation of said ram causes the head of said ram to penetrate said die to compress said powder; an annular member having an inside surface, a first helical tooth system on said inside surface, an outside surface and a second helical tooth system on said outside surface, said member being positioned around said ram carrier with the first tooth system of said member engaged with the tooth system of said ram carrier; an annular casing having an inside surface and a helical tooth system on said inside surface, said casing being positioned around said member with the tooth system of said casing engaged with the second tooth system of said member, the tooth systems of said ram carrier and said member and casing having a predetermined relationship with the pitch and inclination of the helically toothed portions of the parts produced by said apparatus; and means for moving said casing in a manner whereby said ram is rotated thereby causing penetration of the head of said ram into said die.

2. Apparatus as claimed in claim 1, further comprising a second ram, a second ram carrier affixed to said second ram and having an outside surface, said second ram carrier having a helical tooth system on its outside surface, a second annular casing having an inside surface and a helical tooth system on said inside surface, said second casing being positioned around said second ram carrier, a second annular member engaging the tooth system of said second ram carrier and the tooth system of said second casing, the tooth systems of said second ram carrier and said second casing and said second annular member having a predetermined relationship with the pitch and inclination of the helically toothed portions of the parts produced by said apparatus, said second casing being positioned in a manner whereby movement of said first-mentioned casing causes movement of said second casing in a manner whereby said second ram is rotated thereby causing penetration of said second ram into said die.

3. Apparatus as claimed in claim 2, wherein said second annular member has an inside surface, a first helical tooth system on said inside surface, an outside surface and a second helical tooth system on said outside surface, said second member being positioned around said second ram carrier and within said second casing with the first tooth system of said second member engaged with the tooth system of said second ram carrier and with the second tooth system of said second member engaged with the tooth system of said second casing.

References Cited
UNITED STATES PATENTS

| | | | |
|---|---|---|---|
| 2,561,735 | 7/1951 | Haller | 18—16.5 |
| 2,682,080 | 6/1954 | Saalfrank | 18—16.5 |
| 2,767,428 | 10/1956 | Pingel | 18—16.5 XR |

FOREIGN PATENTS 505,815   12/1954   Italy.

WILLIAM J. STEPHENSON, *Primary Examiner.*